United States Patent [19]
Carstens

[11] Patent Number: 5,744,257
[45] Date of Patent: Apr. 28, 1998

[54] PRODUCTION OF COMPOSITES

[75] Inventor: Pieter Andries Blatt Carstens, Pretoria, South Africa

[73] Assignee: Atomic Energy Corporation of South Africa Limited, Pelindaba, South Africa

[21] Appl. No.: 398,098

[22] Filed: Mar. 3, 1995

[51] Int. Cl.⁶ .................................................. B32B 17/00
[52] U.S. Cl. ........................ 428/703; 428/297; 428/302; 428/303
[58] Field of Search .................... 428/34.4, 34.5, 428/375, 392, 696, 703, 36.9, 36.91, 36.92, 302, 303, 297

[56] References Cited

U.S. PATENT DOCUMENTS

| | | | |
|---|---|---|---|
| 3,647,613 | 3/1972 | Scotland | 161/165 |
| 3,865,615 | 2/1975 | Manly | 117/47 A |
| 4,020,223 | 4/1977 | Dixon et al. | 428/224 |
| 4,123,287 | 10/1978 | Cockram | 106/99 |
| 4,142,032 | 2/1979 | D'Angelo | 526/43 |
| 4,237,156 | 12/1980 | Boultinghouse | 427/255.1 |
| 4,264,750 | 4/1981 | Anand et al. | 525/356 |
| 4,296,151 | 10/1981 | Boultinghouse | 427/255.1 |
| 4,404,256 | 9/1983 | Anand et al. | 428/409 |
| 4,508,781 | 4/1985 | Yagi et al. | 428/409 |
| 4,557,945 | 12/1985 | Yagi et al. | 427/40 |
| 4,764,405 | 8/1988 | Bauman et al. | 428/35 |
| 4,818,619 | 4/1989 | Strepparola et al. | 428/421 |
| 4,880,879 | 11/1989 | Bauman | 525/130 |
| 4,915,739 | 4/1990 | Sawanobori | 106/99 |
| 4,916,012 | 4/1990 | Sawanobori | 428/367 |

FOREIGN PATENT DOCUMENTS

| | | |
|---|---|---|
| 63 074 946 | 4/1988 | Japan. |
| 01 172 249 | 7/1989 | Japan. |
| 05 098 565 | 4/1993 | Japan. |
| 85/9500 | 11/1985 | South Africa. |
| 87/8240 | 3/1987 | South Africa. |

OTHER PUBLICATIONS

Chong, et al., *Modification of carbon fiber surfaces by direct fluorination*, Journal of Fluorine Chemistry, 57 (1992) pp. 169–175.

du Toit et al., *The effect of surface fluorination on the wettability of high density polyethylene*, Journal of Fluorine Chemistry, 74 (1995) pp. 43–48.

S. Goldfein, "Fibrous Reinforcement For Portland Cement", Modern Plastics, 42, (1965.04), 8, 156/160.

(List continued on next page.)

*Primary Examiner*—Timothy Speer
*Attorney, Agent, or Firm*—Marshall, O'Toole, Gerstein, Murray & Borun

[57] ABSTRACT

A process for producing a composite material, structure or artifact comprising a cementitious substrate or matrix which is strengthened or reinforced by reinforcing material which adheres thereto, includes bringing a reinforcing component into contact with a cementitious substrate component which is in a settable state. The substrate component is allowed to set in contact with the reinforcing component, thereby to adhere thereto. Adhesion of the substrate component to the reinforcing component is enhanced by, prior to bringing the components into contact with each other, subjecting the reinforcing component to surface fluorination thereof.

7 Claims, 5 Drawing Sheets

OTHER PUBLICATIONS

A.E. Naaman, et al., "Some Developments in Polypropylene Fibers for Concrete" Fiber Reinforced Concrete; International Symposium, SP–81 ACI (American Concrete Institute), Detroit, USA 1984, pp. 375–396.

Z. Bayasi, et al. "Properties of Polypropylene Fiber Reinforced Concrete"; ACI (American Concrete Institute) Materials Journal, vol. 90, No. 6, Nov.–Dec. 1993, pp. 605–610.

P. Soroushian, et al., "Mechanical Properties of Concrete Materials Reinforced with Polypropylene or Polyethylene Fibers"; ACI (American Concrete Institute) Materials Journal, vol. 89, No. 6, Nov.–Dec. 1992, pp. 535–540.

R.N. Swamy, et al., "Influence of Fiber Reinforcement on Restrained Shrinkage and Cracking"; ACI (American Concrete Institute) Materials Journal, vol. 76–21; Mar. 1979, pp. 443–460.

"Measurement of Properties of Fiber Reinforced Concrete"; ACI (American Concrete Institute) Materials Journal, vol. 85–M58, Nov. Dec. 1988, pp. 583–593.

H. Krenchel, et al., "Restrained Shrinkage Tests with PP–Fiber Reinforced Concrete", Fiber Reinforced Concrete Properties and Applications; International Symposium, SP–105, ACI (American Concrete Institute), Detroit, USA, 1987, pp. 141–158.

M.A. Sanjuan, et al., "Plastic Shrinkage and Permeability in Polypropylene Reinforced Mortar"; Thin–Section Fiber Reinforced Concrete and Ferrocement; International Symposium, SP–124, ACI (American Concrete Institute), Detroit, USA, 1990, pp. 125–136.

S.P. Shah, et al., "Comparison of Shrinkage Cracking Performance of Different Types of Fibers and Wiremesh", Fiber Reinforced Concrete Developments and Innovations; International Symposium, SP–142, ACI (American Concrete Institute), Detroit, USA, 1994, pp. 1–11.

N.S. Berke, et al., "The Effect of Low Addition Rates of Polypropylene Fibers on Plastic Shrinkage Cracking and Mechanical Properties of Concrete"; Fiber Reinforced Concrete Developments and Innovations; International Symposium, SP–142, ACI (American Concrete Institute), Detroit, USA, 1994, pp. 19–42.

M. Tavakoli, "Tensile and Compressive Strengths of Polypropylene Fiber Reinforced Concrete"; Fiber Reinforced Concrete Developments and Innovations; International Symposium, SP–142, ACI (American Concrete Institute), Detroit, USA, 1994, pp. 61–72.

M.A. Williams, et al., "Incorporation of Surface–Modified UHMWPE Powders and Fibers in Tough Polyurethane Composites", Polymer Engineering and Science, Mid–Jul. 1991, vol. 31, No. 13, pp. 992–998.

PRODUCTION OF COMPOSITES

FIELD OF THE INVENTION

This invention relates to a process for the production of composite materials, structures and/or artifacts wherein a substrate or matrix is strengthened or reinforced by reinforcing material. The invention also relates to such composite materials, structures and/or artifacts, particularly when produced by means of said process.

SUMMARY OF THE INVENTION

According to a first aspect of the invention, there is provided, in the production of a composite material, structure or artifact which comprises a cementitious substrate or matrix which is strengthened or reinforced by reinforcing material which adheres thereto, by bringing a reinforcing component into contact with a cementitious substrate component which is in a settable state, and causing or allowing the substrate component to set in contact with the reinforcing component, thereby to adhere thereto, there is provided a process for enhancing adhesion of the substrate component to the reinforcing component, which process comprises the step, prior to bringing the components into contact with each other, of subjecting the reinforcing component to surface fluorination thereof.

According to a second aspect of the invention, there is provided a composite material, structure and/or artifact which comprises a cementitious substrate or matrix strengthened or reinforced by reinforcing material which adheres thereto, the substrate or matrix comprising a settable cementitious substrate component which has set in contact with a reinforcing component comprising said reinforcing material and adheres thereto, the reinforcing component having a fluorinated surface to which the substrate component adheres.

The cementitious matrix may have a relatively low tensile strength and/or low fracture toughness, while the reinforcing component may have a relatively high tensile strength. In particular, the matrix may be of a cementitious material, such as cement, concrete, cementitious mortar or related cement-containing castable or settable materials.

The material of the reinforcing component is thus solid at ambient temperature, and may be selected from:

(i) aliphatic polyolefins, for example, polyethylene, and polypropylene, and other polymers such as polyethylene terephthalate, polyethylene terephthalate glycol, polycarbonate, and polyvinyl chloride;

(ii) polymerized conjugated dienes and copolymers or block copolymers comprising monomers of typically 4–12, preferably 4–8, carbon atoms per molecule, such as 1,3-butadiene, isoprene, 2,3-dimethyl-1,3-butadiene, piperylene, 3-butyl-1,3-octodiene, phenyl-1,3-butadiene;

(iii) polymerized vinyl and substituted aromatic compounds comprising monomers such as styrene, 1-vinylnaphthalene, 2-vinyl-naphthalene, and the alkyl, cycloalkyl, aryl, alkaryl, and aralkyl derivatives thereof, in which the total number of carbon atoms in the combined substituents is $\leq 12$, such as 3-methylstyrene, 4-n-propylstyrene, 4-cyclohexylstyrene, 4-dodecylstyrene, 2-ethyl-4-benzylstyrene, 4-p-tolylstyrene and 4-(4-phenyl-n-butyl) styrene;

(iv) aromatic polyamides such as KEVLAR (trade name);

(v) carbon, e.g., graphite; and (vi) glass.

Without wishing to be bound by theory, the Applicant believes that surface fluorination involves modifying the smooth surface of the reinforcing component by replacing some functional chemical groups thereof by fluorine and other groups, i.e., by functionalizing the surface of the reinforcing component. In this fashion, the hydrophobic nature of the surface is changed, and electronegativity is imparted thereto. This enhances workability of the reinforcing component, and hence physical adhesion of cementitious matrix thereto. However, it is also believed that surface fluorination modifies the surface of the reinforcing component in such a fashion to obtain a chemical bond with the cementitious matrix. This is achieved, it is believed, by surface fluorination activating the surface and causing free radicals to form on the surface. These free radicals react with oxygen present in the concrete, to cause chemical bonding of the cementitious matrix to the reinforcing component. Typical radicals which form are —CF, acyl fluoride, or the like. The reaction thereof with the cementitious matrix is slow, and can be promoted by acid or water hydrolysis, especially mineral acid hydrolysis. Thus, the fibers may be contacted with, e.g., submerged into, a dilute mineral acid solution, e.g., a hydrochloric acid solution.

In one embodiment of the invention, the reinforcing component may comprise particles, e.g., granules or fibers, of the reinforcing material. In particular, the reinforcing component may then be in the form of fibers. The fiber lengths may be 3–600 mm, typically 10–50 mm, and the fiber widths may be 5–1000 µm. The proportion of fibers in the substrate or matrix can vary over a wide range, but it is expected that it will usually be 2–85%, by volume. Typically, the fibers are manufactured as continuous monofilaments of regular cross-section, e.g., circular, which are then chopped into short discrete fibers, or as fibrillated films or tapes. Fibers of polypropylene are believed to be particularly suitable in view of their alkali resistance in the alkaline environment of the cementitious matrix, relatively high melting point, and relatively low cost.

The composite material, structure or artifact may then be formed by mixing the fibers with the matrix material or cementitious substrate component, when the substrate component is in castable, extrudable or flowable form, e.g., in powder, slurry, paste or liquid form, and shaping a product such as a structure or artifact, e.g., by casting or molding, after which the matrix material is allowed or caused to set, thereby adhesively securing itself to the fibers. Thus, the composite material, structure or artifact can be formed in known fashion such as by means of premixing, spray-up, shotcreting, a pulp-type process, hand lay-up, and continuous production. The fibers are uniformly but randomly distributed throughout the composite material, structure or artifact.

In another embodiment of the invention, the reinforcing component may be in the form of a glass, carbon, e.g., graphite, or plastic bar, rod, grill, sieve, mat, mesh, web, shaped reinforcing element, or fiber sheeting. When in the form of a bar or rod, the reinforcing component may be relatively short or long, in the fashion of steel reinforcement. The mat, when used, may be perforated, such as a polyethylene mat available in South Africa under the trademark "LOKFLOR" from Dita Product (Pty) Limited of 138 Axle Road, Devland, Johannesburg, South Africa. The mesh, when used, may be cast or woven. The shaped reinforcing element, when used, may be a bar or rod of X or Y cross-sectional shape. The fiber sheeting, when used, may be woven or felted. Instead, the reinforcing component may then be of any other suitable shape and dimension, provided that it has said fluorinated surface. The reinforcing component will then be embedded in the cementitious matrix. This may be effected by locating it in the matrix material while in castable, extrudable or flowable form, after which the matrix material is caused or allowed to set, thereby adhesively to secure itself to the reinforcing component.

In yet a further embodiment of the invention, the reinforcing component may be secured, as a surface layer, to the substrate component, thereby to reinforce the substrate component and thus form the composite structure or artifact. In this case the cementitious substrate may be cast in contact with the surface-fluorinated surface reinforcing layer. In particular, the composite artifact may be a pipe wherein the reinforcing component is adhesively attached to the cementitious substrate component, said components being tubular and the reinforcing component forming an internal and/or external lining for the cementitious component, adhesively secured thereto, the surface of the reinforcing component which is adhesively secured to the cementitious component being fluorinated.

Any suitable method can be used to fluorinate the surface of the reinforcing component before the components are adhesively secured together. By "fluorinated" is meant that the surface of the reinforcing component is treated with a fluorine-containing gas to provide fluorine substituents bound to said surface. Any suitable fluorination process may be used for this purpose, for example, the fluorinating processes described in U.S. Pat. Nos. 3,647,613; 3,865,615; 4,020,223; 4,142,032; 4,237,156; 4,264,750; 4,296,151; 4,404,256; 4,508,781; 4,557,945; 4,764,405 and 4,818,619; as well as South African Patent Nos. 85/9550 and 87/8240.

Preferably, however, the fluorinating is effected by exposing the reinforcing component to a fluorine-containing gas at a pressure of 1–500 kPa, preferably 5–150 kPa, and at a temperature above 0° C. and below the melting point of the material of the component, typically 20°–100° C. The fluorine-containing gas may be fluorine itself ($F_2$), a fluorinated noble gas such as $XeF_2$, or a fluorohalogen such as $ClF_3$, $BrF_5$, $IF_7$, or the like. The fluorine-containing gas may form part of a mixture with another gas, such as an oxide of sulfur, an oxide of nitrogen, an oxide of carbon, a halogen, an interhalogen, nitrogen, oxygen, ozone, or mixtures thereof, such as air. The proportion of the fluorine-containing gas in such gas mixture can vary within wide limits. Thus, the fluorine-containing gas may form 0.1–99.9%. by volume of said mixture, typically 1–30% by volume thereof. Particularly preferred gas mixtures include those comprising 5–20%. by volume of fluorinating gas such as $F_2$ and 5–95% by volume oxygen ($O_2$). The fluorination will usually take place in a reactor comprising a vacuum chamber with provision for feeding thereto and withdrawal therefrom of gases, pressure control, temperature control and control of the composition of gas mixtures therein.

In particular, the fluorination may be such as to provide the fluorinated component with a surface tensin at 20° C. of at least 40 mN/m.

The invention will now be described, by way of illustrative example, with reference to the following worked examples, and the accompanying drawings:

DETAILED DESCRIPTION OF THE PREFERRED EMBODIMENTS

Test No. 1

Example 1

Invention

Figure 1:
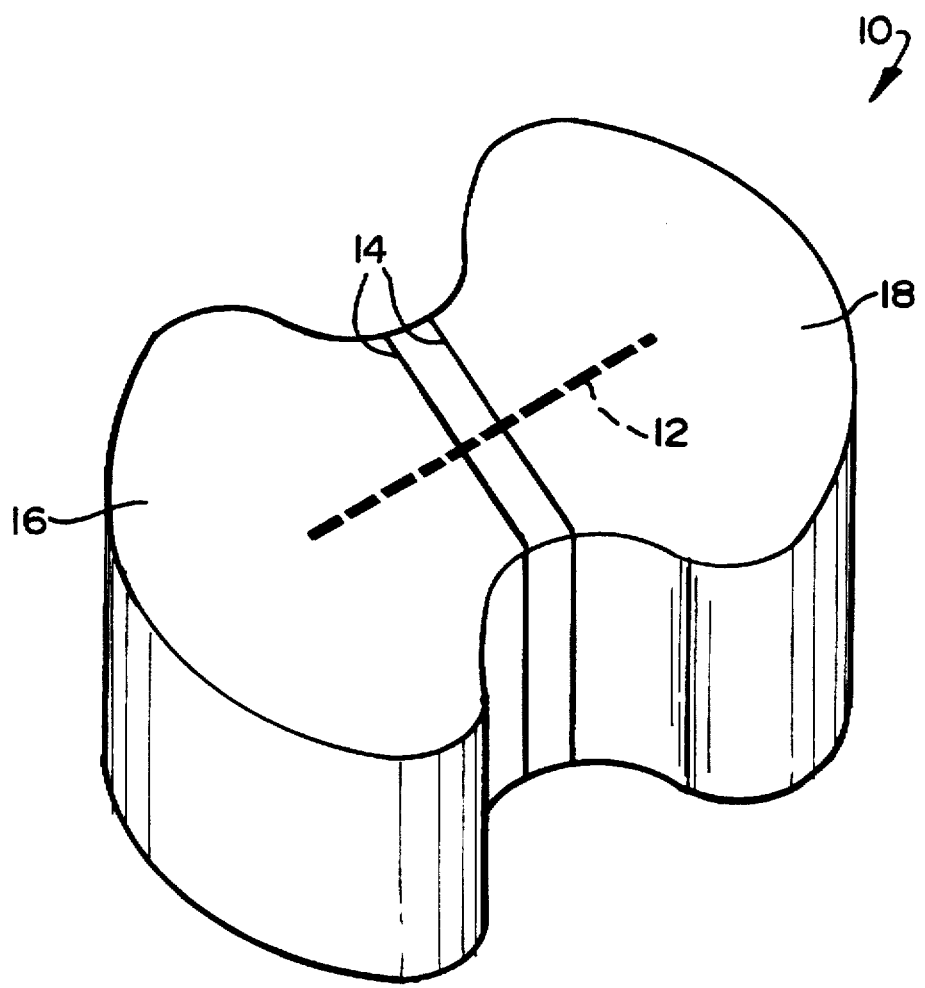
FIG. 1 shows a three-dimensional drawing of the test samples used for the fiber pull-out tests in Test No. 2.

Polypropylene fibers having a length of 500 mm and a diameter of 25 µm were placed in a 20 l stainless steel vacuum reaction vessel which was evacuated and then charged with a fluorine/oxygen fluorinating atmosphere having an $F_2:O_2$ volume ratio of 10:90 at a pressure of 5 kPa. The fibers were exposed to this atmosphere for 30 minutes to fluorinate their surfaces, after which the fluorinating atmosphere was evacuated from the vessel and the fibers removed.

The fluorinated fibers were then mixed with a concrete test mixture having the following formulation:

| Constituent | parts by mass |
|---|---|
| Aggregate (stone) | 3 |
| Sand | 2 |
| Portland Cement | 1 |
| Water | 1 |

The mixing was to obtain a homogeneous mixture and the proportions used were 15 kg of fibers to one (1) $m^3$ of concrete mix, i.e., a fiber:concrete volume ratio of 2:98. The mixture was charged into molds and vibrated to a constant (maximum) density and allowed to set. Mold dimensions used were 300×75×75 mm; 300×75×15 mm and 300×75×12 mm.

Example 2

Control

Example 1 was repeated except that the fibers were not subjected to fluorination.

Example 3

Invention

Example 1 was repeated except that the polypropylene fibers were replaced by the same proportion of polypropylene netting. This netting was used to reinforce the concrete blocks in the molds by half-filling the molds with the concrete mix, laying a netting panel flat thereon of the same outline as the horizontal cross-section of the mold, and then completely filling the mold. The netting was that available in South Africa from Alnet (Proprietary) Limited and sold under the Trademark "ALNET 80%."

Example 4

Control

Example 3 was repeated except that the netting was not fluorinated.

The test cubes or blocks formed in the molds were subjected to crushing and other tests after curing, i.e., after at least 28 days.

The tests on the test cubes disclosed the following:

Firm and complete bonding appeared to have taken place between the fluorinated fibers or netting on the one hand, and the concrete matrix on the other hand. Thus cutting the cubes to expose the fibers or netting, as the case may be, disclosed, to a visual inspection, tight bonding of the fluorinated fibers and netting to the concrete, and exposed fibers could not be withdrawn from the concrete matrix by hand, without breakage thereof;

In contrast, when the fibers and netting were not fluorinated, similar tests showed that no bonding was discernable between the fibers or netting and the concrete, and exposed fibers could easily be withdrawn, without breakage thereof, from the concrete matrix; and The use of fluorinated fibers or netting appeared to result in an increase in cube strength, compared with unfluorinated fibers or netting, it being noted, however, that, while tensile strength appears to be improved, compressive strength appears to be unaffected and to be substantially the same as that of concrete having no fiber or netting reinforcement.

Test No. 2

The raw materials in this test were all commercially available, and were as follows:

polypropylene fiber: polypropylene square filament produced by direct extrusion, 0.5×1.3 mm rectangular cross-section, 19 mm long, specific gravity 0.91, tensile strength of 120 MPa and elongation at break of 14%.

cementitious material: mixture of 80% (weight) ordinary Portland cement and 20% (weight) fly ash.

aggregate: river gravel with a maximum particle size of 9 mm; dried natural river sand.

The polypropylene fibers were surface modified using the following procedure: A steel vacuum reaction vessel of 11 m³ was used. It was evacuated to 10 kPa (absolute). It was then loaded with a 20% $F_2$/80% $N_2$ mixture up to an absolute pressure of 30 kPa (room temperature). No oxygen was introduced. The oxygen in the residual air in the vessel was utilized for oxy-fluorination. Exposure was for 30 minutes.

The plain concrete and all the cementitious substrate component for the test specimens were prepared in a rotary drum mixer using the following mixing ratio and mixing procedure:

Mixing Ratio (By Mass)

Cement: Fly ash: Water: Fine aggregate: Coarse aggregate=0.8: 0.2: 0.42: 1.5: 1.5:

Mixing Procedure

Charge the mixer with the total amount of stone and sand. After start, mix for 30 seconds. Add one-third of the water, and mix for 1 minute. Add half of the cementitious material together with another one-third of the water over a 2 minute period. Add all the fibers to the mixer in a gradual manner so that balling and bunching up of fibers in the cementitious substrate component or mix is prevented and even distribution of fibers is achieved. In this investigation, fiber volume fractions of 0.3%, 1.0% and 2.0% were used to prepare modified polypropylene ("MPP") and unmodified polypropylene ("UMPP") fiber reinforced concrete ("FRC") specimens. Add remainder of the cementitious materials together with remainder of the water over a 2-minute period.

All the specimens were manufactured by casting fresh mix into molds in two layers (flexural tests) or three layers (compression tests) with compaction achieved through tamping using a round straight steel rod 16 mm in diameter and 600 mm in length. After casting, the specimens were kept in the molds for 24 hours, and then removed from the molds and water-cured at 21°±2° C. until the test age of 28 days.

The following tests were conducted on hardened specimens: compression on 150 mm diameter by 300 mm high cylindrical specimens (ASTM C-39); impact drop-weight on 152 mm diameter by 53.5 mm thick specimens (ACI Committee 544 Report entitled "Measurement of Properties of Fiber Reinforced Concrete", Title No. 85-M58, ACI Materials Journal, November–December 1988, Pg. 583–593); flexure on 100×100×350 mm prismatic specimens with a 300 mm span (ASTM C-1018).

Restrained shrinkage tests were carried out using a steel ring/shrinkage test. A wooden base cylindrical mold with a heavy steel ring in the middle was used to cast a ring-shaped concrete specimen (diameter: 170/250 mm, thickness: 40 mm). After demolding, the top and bottom surfaces of the ring specimens were sealed using silicone rubber, so that drying (water evaporation) could be achieved only through the outer circumferential surfaces of the specimens. The specimens were air-dried at 21°±2° C. The width and length of the cracks which formed were measured every 5 days to quantify the crack controlling capacity of the cementitious substrate.

Fiber pull-out tests were conducted on dumbbell shaped specimens, indicated by reference numeral 10 in FIG. 1. The thickness of the specimens was 20 mm, while their maximum width was 51 mm. A custom-made mold of polymethyl methacrylate was used to prepare the fiber embedment specimens. A fiber 12 was embedded in the middle of the specimen, and double plastic sheets 14 were used to prevent bonding between the two lobed parts 16, 18 of the sample. After 24 hours, the specimen was released from the mold and then water-cured for 28 days at 21°±2° C. The pull-out tests were done on a motor driven Monsanto (trademark) tensiometer at an extraction rate of 10 mm/min, and "C" shaped pincers manufactured from steel were used to apply the load to the specimen. The adhesional shear bond strength was calculated using the following equation: $T_{au}=P/(AL)$, here P is the maximum pull-out force before debonding, A is the circumference of the fiber and L is the bonding strength.

The workability of fresh MPP and UMPP fiber FRC compared with plain concrete was determined through the standard slump test and time of flow of FRC through the inverted slump cone test according to ASTM C-143 and ASTM C-995, respectively. The water absorption and apparent porosity of plain, MPP fiber and UMPP fiber concrete were measured using ASTM C-948 method.

All the results presented are average values calculated from three specimen tests.

TABLE 1

Workability of fresh plain concrete, polypropylene ("PP") fiber reinforced concrete and modified PP fiber reinforced concrete

| Testing series | Fiber volume Content (%) | Slump (mm) | Time of flowing through inverted slump cone(s) |
|---|---|---|---|
| Plain concrete | 0 | 25 | 7.41 |
| Unmodified PP fiber reinforced concrete | 0.3 | 11 | 6.40 |
|  | 2.0 | 8 | 10.75 |
| Modified PP fiber reinforced concrete | 0.3 | 14 | 9.46 |
|  | 2.0 | 7 | 9.52 |

TABLE 2

Water absorption and apparent porosity of plain concrete, PP fiber reinforced concrete and modified PP fiber reinforced concrete

| Fiber volume content | 0% | 0.3% | 2.0% | M 0.3% | M 2.0% |
|---|---|---|---|---|---|
| Water absorption | 5.0% | 5.2% | 5.3% | 4.6% | 4.8% |
| Apparent porosity | 8.3% | 8.5% | 8.8% | 7.6% | 8.0% |

Legend: M = modified PP fiber reinforced concrete

TABLE 3

Restrained drying shrinkage crack test* (After 43 days observation)

| Test item | Total number of cracks | Average crack width (mm) | Maximum crack width (mm) | Total crack length (mm) |
|---|---|---|---|---|
| Plain concrete | 3 | 0.24 | 0.37 | 129 |
| UMPP fiber FRC | 3 | 0.079 | 0.10 | 128 |
| MPP fiber FRC | 3 | 0.055 | 0.065 | 104 |

*Plain concrete started to crack 8 days after casting, while the PP fiber and modified PP fiber reinforced concrete started to crack 13 days after casting.

TABLE 4

Effect of cement/aggregate ratio on the shear bond strength of modified PP fiber (water/cement ratio = 0.42)

| Cement/aggregate ratio | 1:1 | 1:2 | 1:3 | 1:5 |
|---|---|---|---|---|
| Shear bond strength (MPa) | 0.55 | 0.54 | 0.38 | 0.12 |

TABLE 5

Effect of water/cement ratio on the shear bond strengths of modified PP fiber (cement/aggregate ratio = 1:3)

| Water/cement ratio | 0.25 | 0.42 | 0.50 | 0.65 |
|---|---|---|---|---|
| Shear bond strength (MPa) | 0.19 | 0.38 | 0.39 | 0.27 |

TABLE 6

Compressive strengths of plain concrete, modified and unmodified PP fiber FRC

| Testing series | Plain concrete | Unmodified PP reinforced fiber concrete | | Modifed PP fiber reinforced concrete | |
|---|---|---|---|---|---|
| Fiber volume content | 0% | 0.3% | 2.0% | 0.3% | 2.0% |
| Compressive strength (MPa) | 33.0 | 34.4 | 30.4 | 32.1 | 34.2 |

It can be seen that the slump of the UMPP or MPP fiber concrete is reduced when compared with plain concrete. Generally, adding fiber into concrete will stiffen the concrete mixture because fiber monofilaments with high aspect ratios have high specific surface area and adsorb a certain amount of mixing water, so that the workability is reduced, especially when being in a static state such as in a slump test. On the other hand, after surface modification, the PP fibers with their hydrophilic surfaces can strongly absorb more water. At the same time, the water is also adsorbed on the surface of cement particles. The strong adsorption of water on the fiber surface leads to lubricating action between the fibers and cement particles or between themselves. Under dynamic conditions, the lubricating actions can be enhanced and fibrous concrete exhibits good mobility. Thus, the dynamic test of time of flow through inverted slump cone test is more practical than the static slump test when measuring the workability of the fibrous concrete. From Table 1, it can been seen that the degree of loss of slump of fibrous concrete is higher than its degree of increase of flowing time when compared with plain concrete.

As is evident from Table 2, incorporating fibers into concrete increases the porosity and discontinuity of the material, and results in higher water absorption and apparent porosity. The water absorption and apparent porosity of FRC is reduced when using MPP fibers, due mainly to the denser interfacial structure and intimate bonding between the modified PP fibers and the cementitious matrix so that inner cracks and voids are reduced. It is generally accepted that a loose and weak layer exists at the interface between the unmodified PP fibers and concrete.

Figure 2:
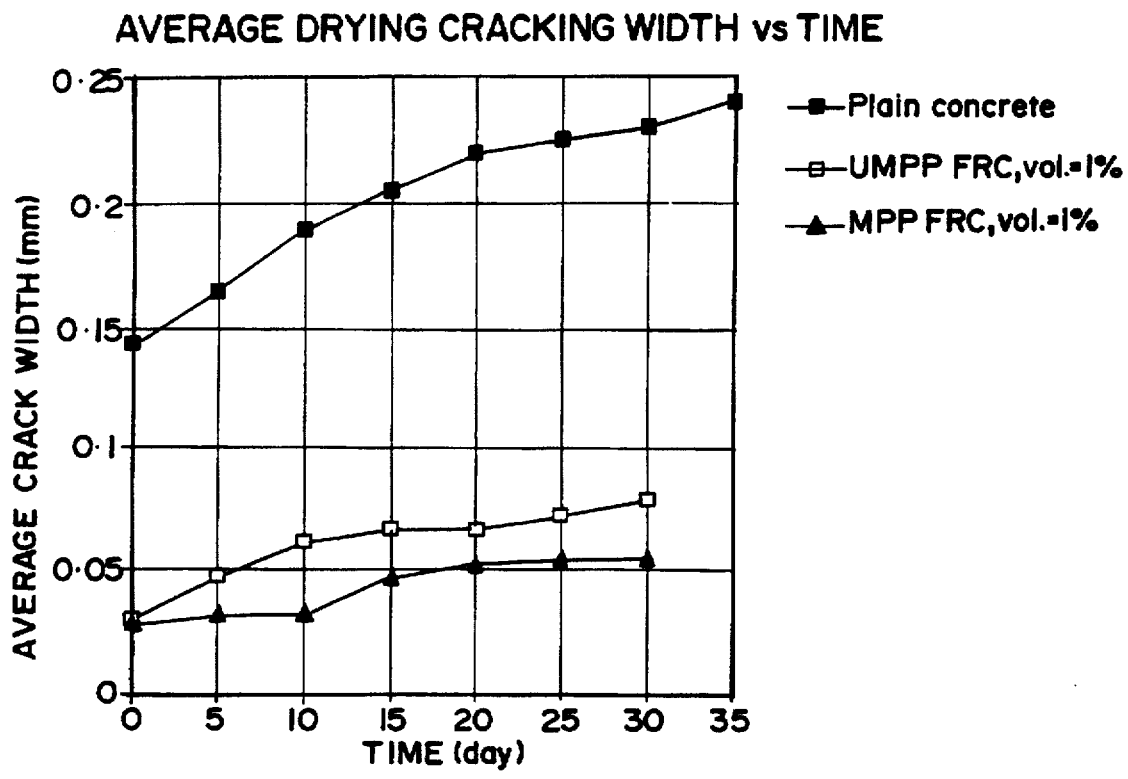
FIG. 2 shows, graphically, the relationship between drying crack width and aging time in Test No. 2.

Adding fibers to concrete largely reduces drying cracking. The drying cracking width of fibrous concrete is lower than that of the plain concrete, and fiber surface modification can improve crack controlling capacity of the fibers, as is evident from Table 3. This is probably due to the stronger adhesion between the PP fiber and concrete matrix by surface modification improving the crack bridging capacity of the PP fibers. The relationship between the drying cracking width and aging time is shown in FIG. 2.

Figure 3:
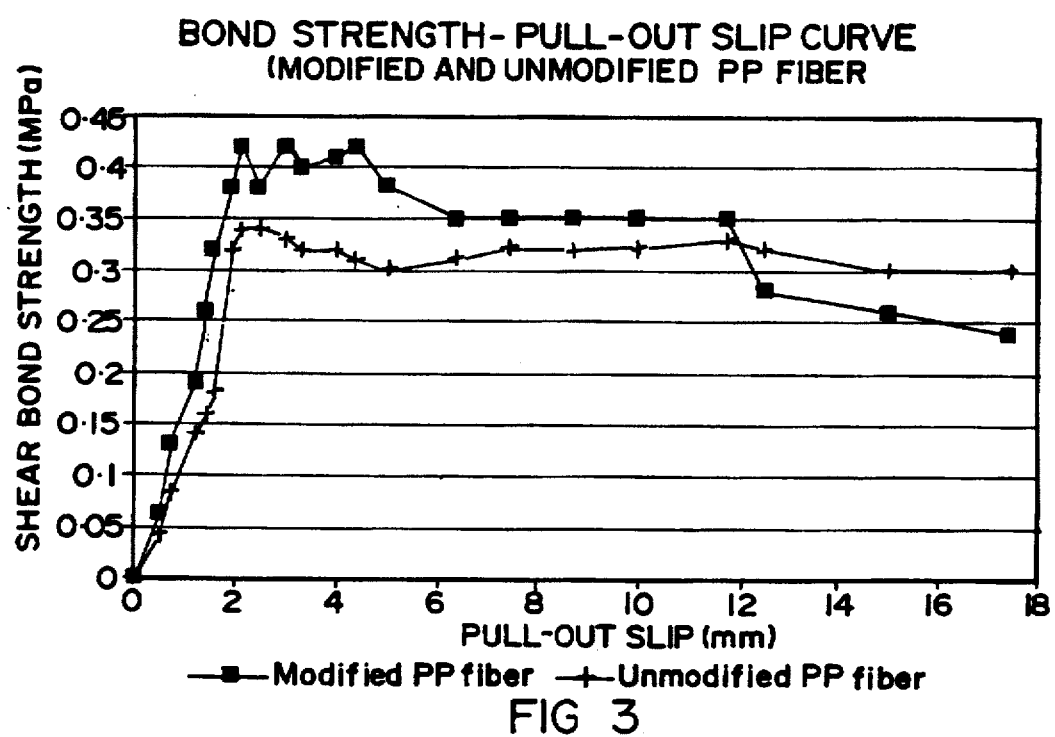
FIG. 3 shows shear bond strength-pull out slip curves of surface modified polypropylene fiber compared with unmodified polypropylene fiber in Test No. 2.
Figure 4:
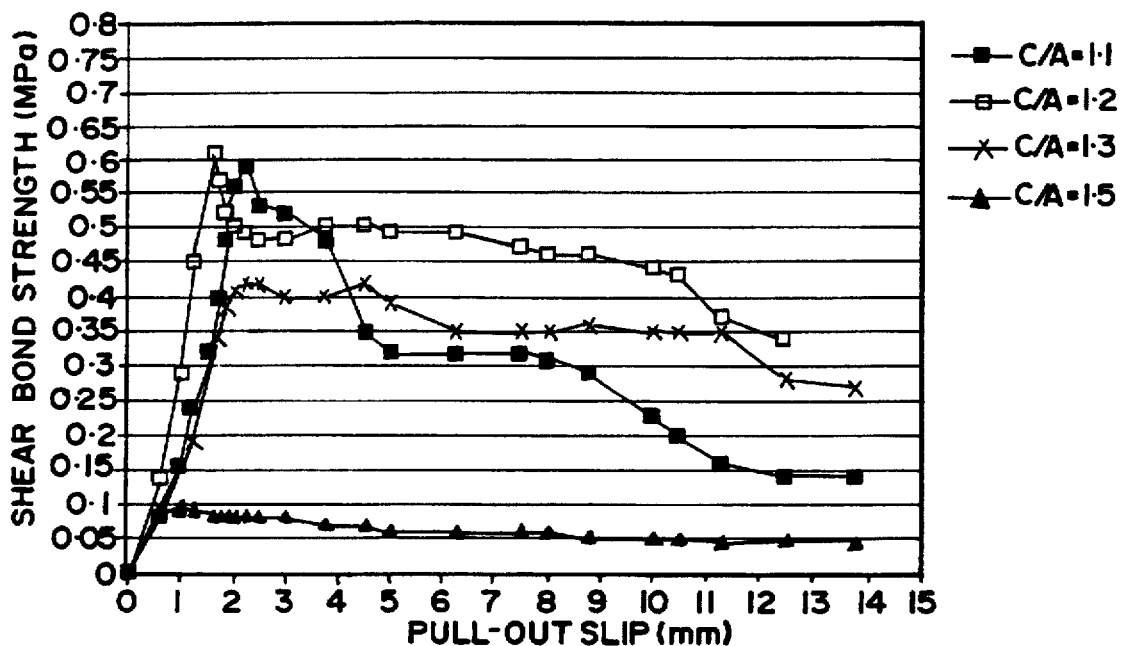
FIG. 4 shows shear bond strength-pull out slip curves of surface modified polypropylene fibers under different cement/aggregate ratios, with a water/cement mass ratio of 0.42.
Figure 5:
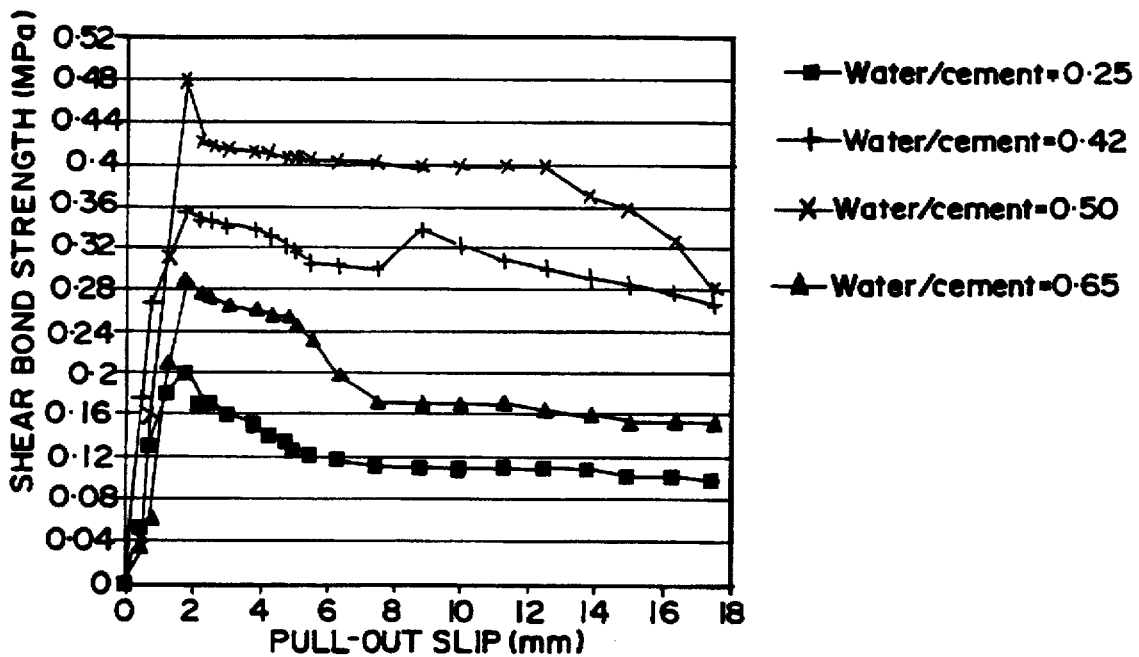
FIG. 5 shows shear bond strength-pull out slip curves of surface modified polypropylene fibers under different water/cement ratios, with a cement/aggregate mass ratio of 1:3.

The PP fiber surface modification improves the interfacial bonding between the PP fiber and cementitious matrix and interfacial shear bond strength increased from 0.34 to 0.38 MPa. The shear bond strength—pull out slip curves of surface modified PP fiber compared with unmodified PP fiber are shown in FIG. 3. The effect of mixing ratios on the interfacial bonding is indicated in Tables 4 and 5, and shear bond strength—pull out slip curves of different matrix mixing ratios are presented in FIGS. 4 and 5. It can be seen that high cement/aggregate ratio (rich concrete matrix) benefits the interfacial bonding since the interface become more dense. At low water/cement ratio, the flowability of the concrete is poor and thus the ability of concrete matrix to wrap the fiber is reduced. Under high water/cement ratio, the concrete matrix become more porous and intimate interfacial bonding cannot be established. Water/cement ratios of between 0.40 and 0.50 thus appear to be the optimum for good interfacial bonding.

Figure 6:
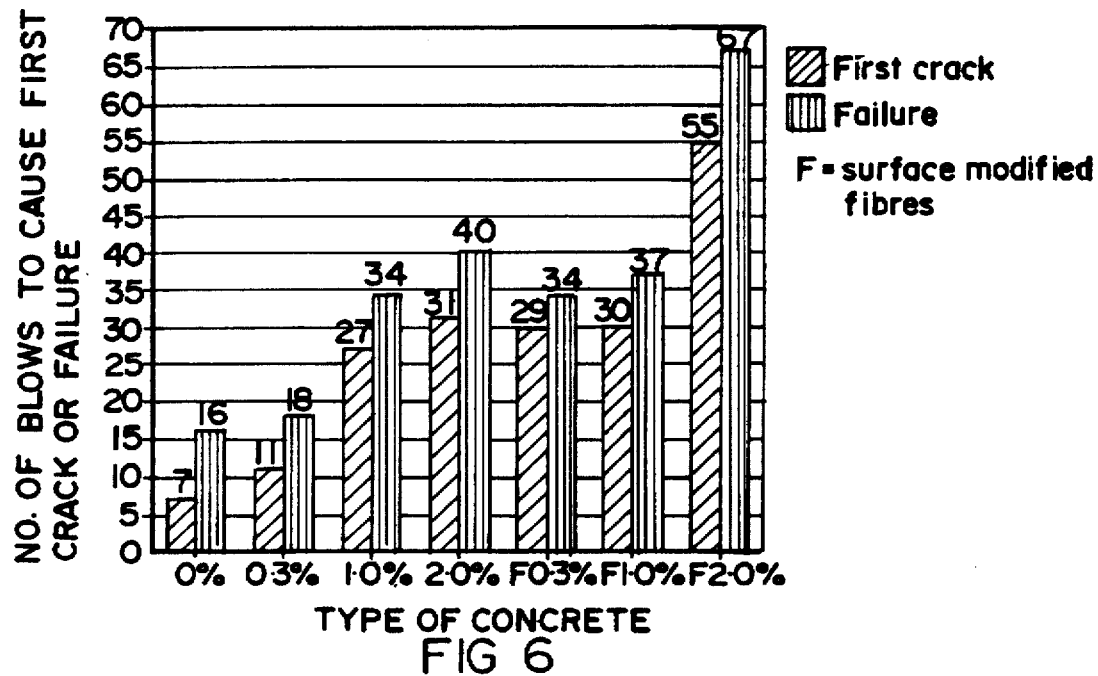
FIG. 6 shows, graphically, impact resistance test results of surface modified polypropylene fiber reinforced concrete compared to plain concrete and unmodified polypropylene fiber reinforced concrete.

Impact resistance test results are shown in FIG. 6. Higher fiber volume fractions benefit impact resistance. Strong interfacial bonding between the fiber and matrix by surface modification benefits load bearing capacity in the post crack zone and thus the performance of FRC under dynamic loading, such as drop-weight impact, is improved.

Figure 7:
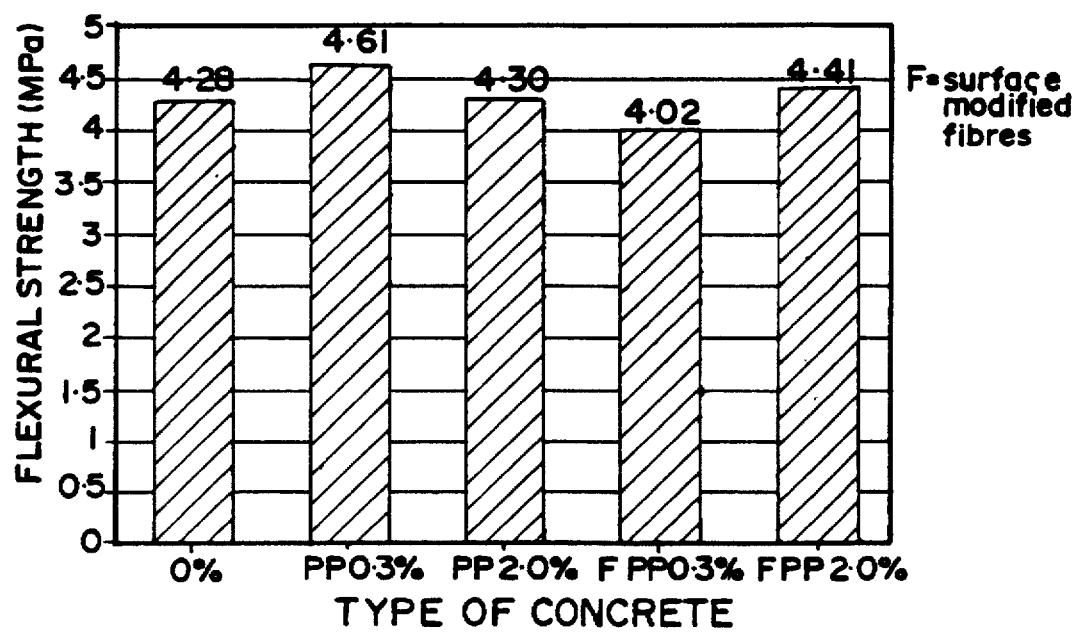
FIG. 7 shows, graphically, flexural strengths of surface modified polypropylene fiber reinforced concrete compared with unmodified polypropylene fiber reinforced concrete and plain or unreinforced concrete.
Figure 8:
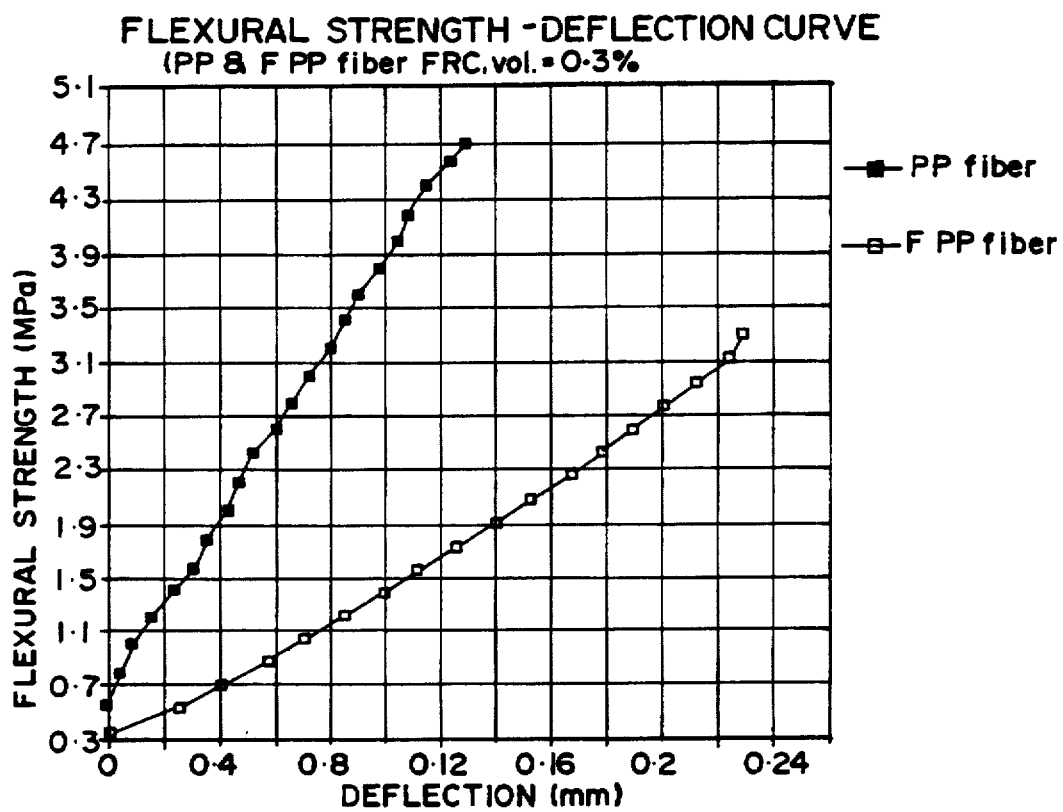
FIG. 8 shows flexural strength-deflection curves of modified and unmodified polypropylene fiber reinforced concrete having a fiber volume content of 0.3%.
Figure 9:
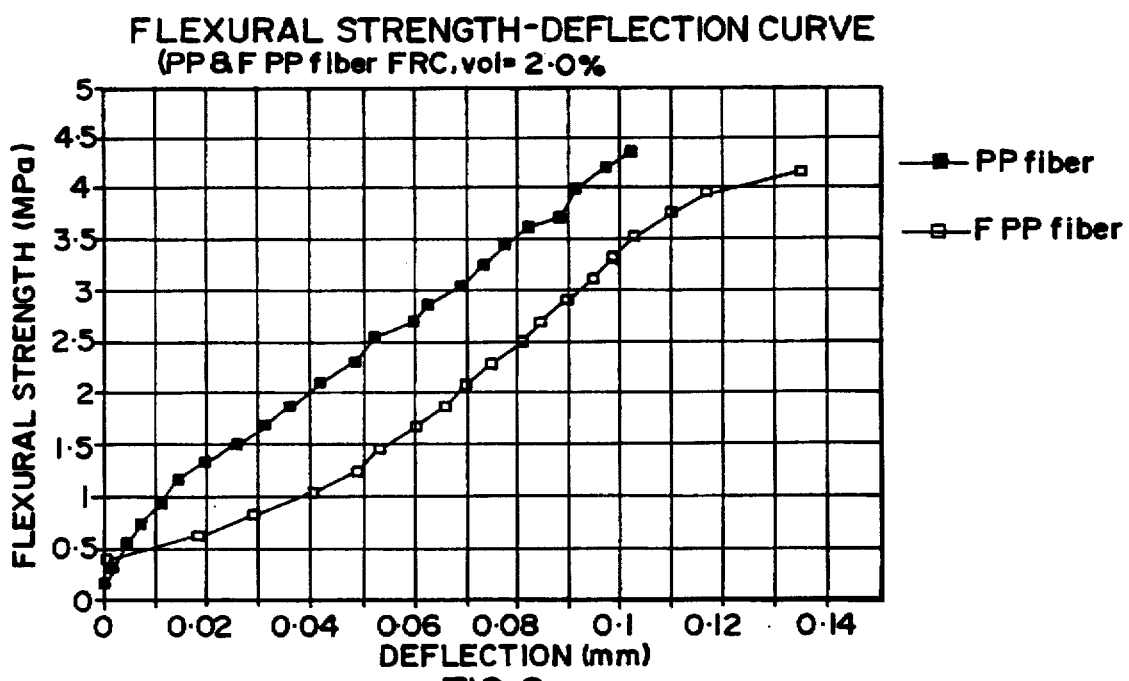
FIG. 9 shows flexural strength-deflection curves of modified and unmodified polypropylene fiber reinforced concrete having a fiber volume content of 2.0%.

Flexural strengths of UMPP and MPP fibers FRC are substantially the same as those of plain concrete, as shown in FIG. 7, which is based on the average of three samples. The flexural strength -deflection curves are nearly linear, as shown in FIGS. 8 and 9, which are based on only one sample in each case. This is probably due to strong interfacial bondings between the MPP fibers and concrete which restrict the friction process between the fiber and matrix when the FRC is subjected to loading; this is the most important factor for FRC to have higher ductility.

The micro interfacial structure of the UMPP and MPP fibers were investigated using scanning electronic microscope ("SEM"). The surfaces of the UMPP fibers and MPP fibers after pulled out from the concrete matrix were observed. More cement hydration products were attached to the MPP fiber surface, indicating strong interfacial adhesion, while the UMPP fibers exhibited smooth surfaces with little hydrated cement paste attached thereto. The interfaces of UMPP and MPP fiber FRC were also examined. It could readily be seen that intimate and dense interfacial bonding was established between the MPP fiber and matrix, while the interface between the UMPP fiber and matrix was loose.

Thus, generally, this test revealed the following:

The bonding between PP fiber and the cement matrix was improved through chemical modification of the fiber surfaces. The water absorption and apparent porosity of the MPP fiber reinforced concrete was smaller than that of the UMPP fiber reinforced concrete, indicating higher crack bridging capacity of the MPP fibers compared with UMPP fibers.

The interfacial bonding between the PP fiber and cementitious matrix improved by 12% (from 0.34 MPa to 0.38 MPa). Since the UMPP and MPP fiber have the same apparent shape and smooth surfaces, the increase in bonding can be attributed to chemical bonding. The higher cement content (rich concrete) matrix benefits the interfacial bonding and optimum water/cement ratio for better bonding ranges from 0.40 to 0.50.

The MPP fiber possesses higher crack controlling capacity when incorporated into concrete to control drying shrinkage cracks than UMPP fiber.

The compressive performance and impact resistance of the PP fiber concrete is improved by using surface modified PP fiber.

SEM observations showed that by means of fiber surface modification more intimate and dense interfacial bondings between the PP fiber and cement matrix were established.

Test No. 3

Example 1

Fluorination With and Without Hydrolysis

Polypropylene fibers having lengths of 120 mm and cross-section of 0.5 by 1.3 mm were placed in a 2 l stainless steel reaction vessel at 50° C. The vessel was evacuated and then charged with fluorine/oxygen fluorinating atmosphere, having a $F_2:O_2$ volume ratio of 10:90, with pressures and times of exposure as specified in Table 7.

TABLE 7

| Test Number | Total pressure (kPa) | Time of Exposure (min) |
|---|---|---|
| 1 | 30 | 30 |
| 2 | 10 | 30 |
| 3 | 30 | 10 |
| 4 | 10 | 10 |

Three fibers were fluorinated under each of the conditions. After completion of fluorination, the fibers of each condition was treated separately as follows:

One fiber was retained without further treatment.

One fiber was submerged in 1 mole/l solution of NaOH for 30 minutes.

One fiber was submerged in 5% v/v HCl solution for 30 minutes.

After the specified time the fibers were removed from the solutions, rinsed with water and dried. Thereafter, cementitious dumbbell shaped test specimens were prepared in the same fashion as for Test No. 2, and fiber pull-out tests conducted thereon, in the same fashion as in Test No. 2, except that the test specimens were tested after 14 days water curing at approximately 21° C. The results obtained are set out in Table 8, which thus shows the relationship between adhesional shear bond strength and method of surface fluorination.

TABLE 8

| PP Fiber Surface Fluorination Method | Adhesional Shear Bond Strength (MPa) | Standard Deviation |
|---|---|---|
| $F_2/O_2$ 10%; 30 KPa, 30 min; HCl 5% v/v | 0.19 | 0.02 |
| $F_2/O_2$ 10%; 30 KPa, 30 min | 0.28 | 0.06 |
| $F_2/O_2$ 10%; 30 KPa, 30 min; NaOH 1 M | 0.24 | 0.05 |
| $F_2/O_2$ 10%; 10 KPa, 30 min; NaOH 1 M | 0.22 | 0.01 |
| $F_2/O_2$ 10%; 10 KPa, 30 min; HCl 5% v/v | 0.34 | 0.01 |
| $F_2/O_2$ 10%; 10 KPa, 30 min | 0.29 | 0.001 |
| $F_2/O_2$ 10%; 30 KPa, 10 min; HCl 5% v/v | 0.25 | 0.05 |
| $F_2/O_2$ 10%; 30 KPa, 10 min; NaOH 1 M | 0.23 | 0.08 |
| $F_2/O_2$ 10%; 30 KPa, 10 min | 0.29 | 0.06 |
| $F_2/O_2$ 10%; 10 KPa, 10 min; NaOH 1 M | 0.26 | 0.08 |
| $F_2/O_2$ 10%; 10 KPa, 10 min | 0.23 | 0.08 |
| $F_2/O_2$ 10%; 10 KPa, 10 min; HCl 5% v/v | 0.16 | 0.05 |
| Unmodified PP Fiber | 0.20 | 0.08 |

What is claimed is:

1. A composite material which comprises a settable cementitious substrate component reinforced by reinforcing material to which the cementitious component adheres by setting in contact with said reinforcing material, the surface of said reinforcing material to which the cementitious substrate component adheres, having been modified by surface fluorination with the reinforcing material being in the form of polymeric fibers uniformly and randomly distributed throughout the cementitious component, said fibers having lengths from 3 mm to 600 mm and widths from 5 µm to 1300 µm, and with the proportion of fibers in the cementitious component being from 0.3% to 85% by volume.

2. A composite material according to claim 1, wherein the cementitious substrate component has a relatively low tensile strength or low fracture toughness, while the reinforcing material has a relatively high tensile strength.

3. A composite material according to claim 2, wherein the reinforcing material is solid at ambient temperature, and is selected from the group consisting of:
  (i) aliphatic polyolefins comprising polyethylene or polypropylene;
  (ii) polymers comprising polyethylene terephthalate, polyethylene terephthalate glycol, polycarbonate, and polyvinyl chloride;
  (iii) polymerized conjugated dienes and copolymer or block copolymers comprising monomers selected from the group consisting of 1,3-butadiene, isoprene, 2,3-dimethyl-1,3-butadiene, piperylene, 3-butyl-1,3-octodiene, or phenyl-1,3-butadiene;
  (iv) polymerized vinyl and substituted aromatic compounds comprising monomers selected from the group consisting of styrene, 1-vinyl-naphthalene, 2-vinyl-naphthalene, 3-methylstyrene, 4-n-propylstyrene, 4-cyclohexylstyrene, 4-dodecylstyrene, 2-ethyl-4-benzylstyrene, 4-p-tolylstyrene and-4-(4-phenyl-n-butyl) styrene; and
  (v) aromatic polyamide.

4. A composite material according to claim 1, wherein the fluorinated reinforcing component has a surface tension at 20° C. of at least 40 mN/m.

5. A composite material according to claim 1, wherein the surface fluorinated surface of the reinforcing material has been subjected to hydrolysis.

6. A composite material according to claim 1, wherein the cementitious substrate component comprises cement and aggregate in a mass proportion of between 1:1 to 1:5.

7. A composite material according to claim 1, wherein the surface fluorinated polymeric fibers are those obtained by contacting polymeric fibers with a fluorine-containing gas comprising 5% to 20% by volume fluorinating gas and 5% to 95% by volume oxygen.

* * * * *